March 25, 1969 — J. J. BABB — 3,435,410
SHALLOW WATER SEISMIC PROSPECTING CABLE
Filed May 20, 1968 — Sheet 1 of 2
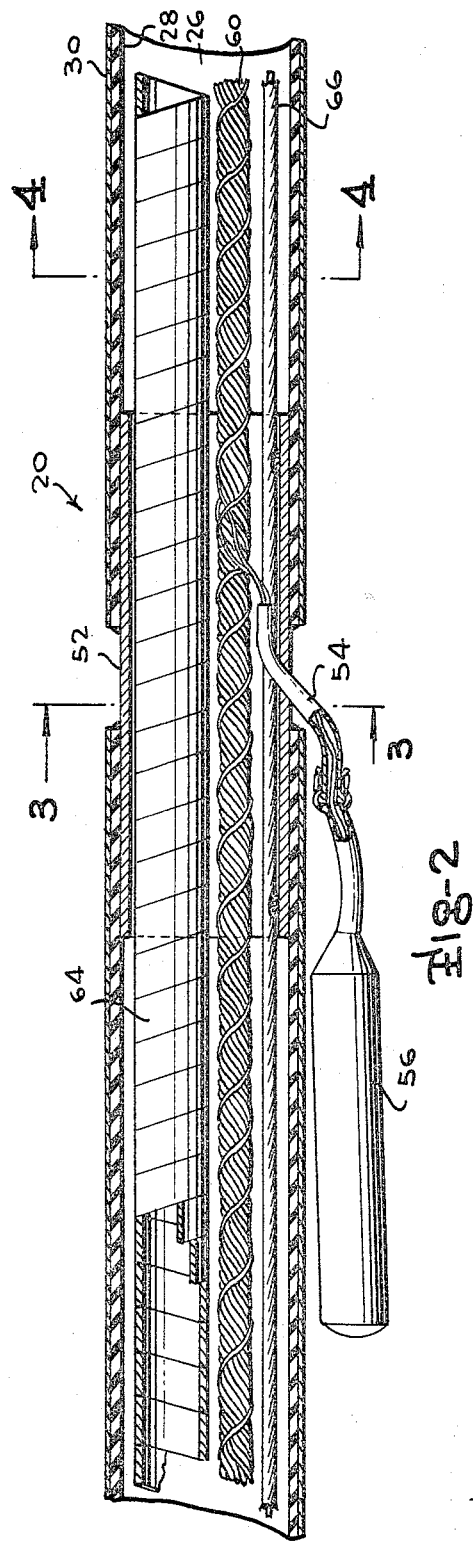
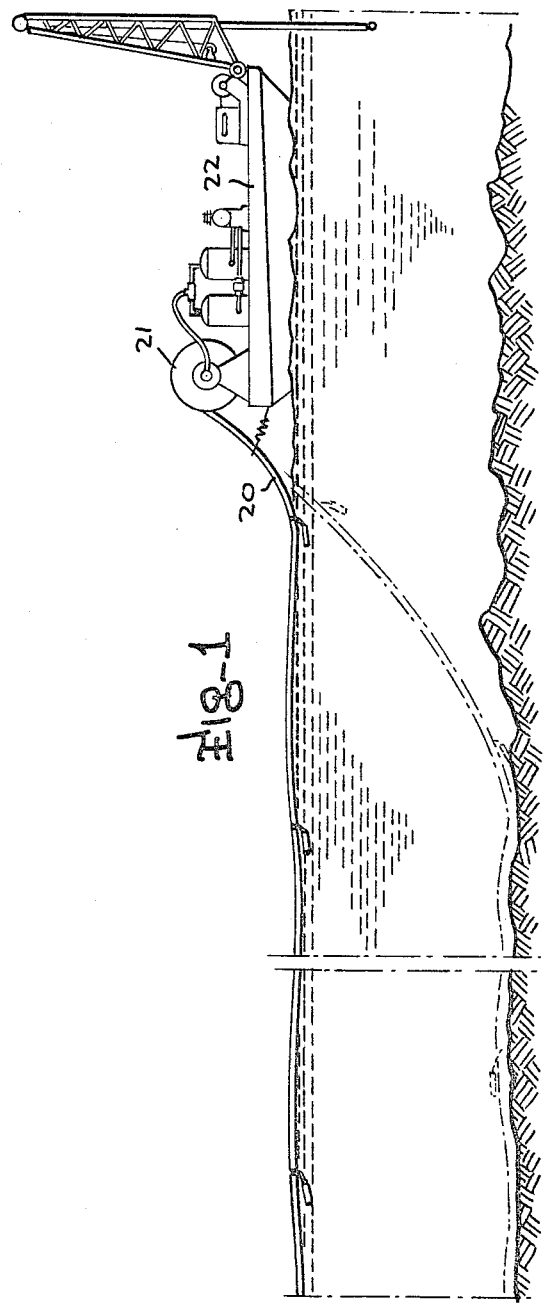
INVENTOR
JOHN J. BABB
BY Mason, Fenwick & Lawrence
ATTORNEYS

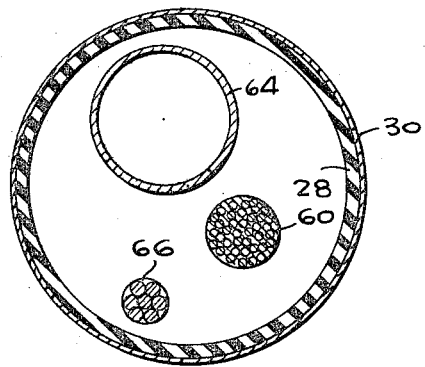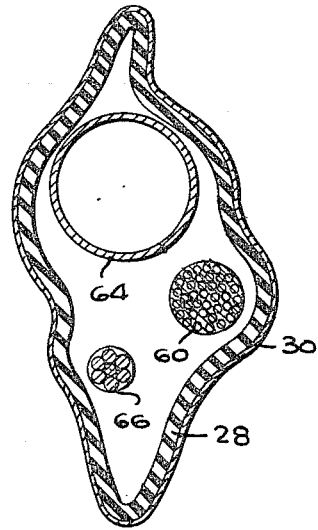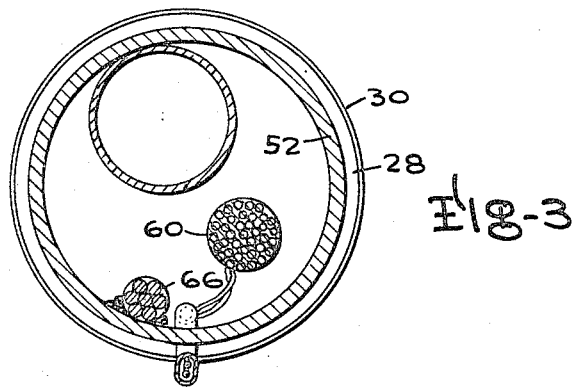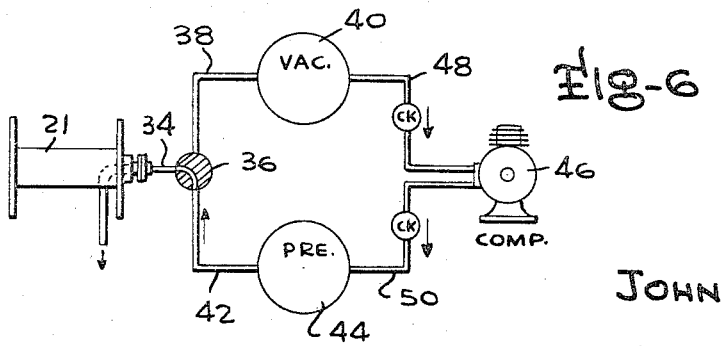

3,435,410
SHALLOW WATER SEISMIC PROSPECTING CABLE
John J. Babb, Jackson, Miss., assignor to Delta Exploration Company, Inc., Jackson, Miss., a corporation of Mississippi
Filed May 20, 1968, Ser. No. 730,503
Int. Cl. H04b 13/02
U.S. Cl. 340—7      10 Claims

ABSTRACT OF THE DISCLOSURE

A shallow-water seismic cable having an elongated flexible enclosing tube which is inflatable and deflatable by an increase and decrease in internal pressure for causing the cable to float or sink with a hollow radially rigid tubular member having an outer diameter less than the inner diameter of the flexible tube located within the flexible tube and a multi-conductor wire cable also within the flexible tube exteriorly of the rigid tubular member so that the radially rigid tubular member prevents complete collapse of the enclosing tube upon reduction of pressure within the enclosing tube.

Background of the invention

This invention is in the field of seismic exploration and is specifically directed to the field of shallow-water marine seismic exploration.

It is conventional practice in deep water seismic exploration to tow a cable behind a ship or boat while taking seismic readings. The cables employed for this purpose are normally operated at a neutral buoyancy and are usually provided with vanes or the like for controlling the depth of operation. It is the usual practice to provide a plurality of seismometers along the length within the interior of such cables and such devices have functioned satisfactorily when towed in deep water. However, deep water cables are not suitable for use in shallow water or in restricted areas such as bays or lakes where towing is impractical. This is true due to the difficulty of maneuvering the cable in restricted areas and also due to the difficulty of maintaining the cable at a proper depth. The seismometers do not function effectively if they are too shallow and dragging contact of the cable with the bottom results in damage to the cable and also causes so much interference as to render a sounding meaningless.

Moreover, it is quite impractical to attempt to pull a cable across the bottom since the cables may be several thousand feet in length. Consequently, a tremendous amount of power would be required for towing such cables and there would be a great likelihood of breakage of the cables. In fact, it is impossible to tow a cable in an area having coral present.

A number of attempts have been made to provide a cable construction which would function satisfactorily and efficiently in shallow water environment. Many of the previously known attempts have employed a buoyant cable held down by weights attached at intervals along the cable. A plurality of seismometers are attached along the length of such a cable and normally float above the cable. However, devices of this sort require relatively deep water in order to function properly since an uneven bottom and shallow water often allows the seismometers to surface where they will not function properly. The bottom is the only satisfactory place for the seismometer and none of the previously known devices have enabled placement of the seismometers on the bottom with a satisfactory degree of reliability.

Moreover, another deficiency of the previously known shallow-water devices resides in the fact that they are quite difficult to move from one location to another. This is due to the fact that many such devices must either be surfaced before they can be moved or they must be dragged across the bottom. Extensive time and manipulation is required for surfacing of the devices and dragging across the bottom from one location to another is not satisfactory due to the large amounts of power required for such a dragging action and the high likelihood of breakage of the cable. Furthermore, such a dragging operation can sometime result in damage to telephone lines or the like buried in the path of dragging movement of the cable.

Therefore, none of the previously known devices employed in shallow water operations have satisfactorily provided the desired functional efficiency necessary for an economical operation. This is true because the prior art devices have either failed to provide accurate output signals or have required an inordinate amount of time and expense for movement from one location to another.

The instant invention overcomes the deficiencies of the prior art by the provision of an inflatable and deflatable cable member which is rapidly deflated to rapidly and forcefully sink the cable to the bottom of the body of water in which the cable is deployed. The sounding is taken with the cable deployed along the bottom and when a sounding exploration has been completed in one location, the cable is quickly reinflated so that it immediately floats on the surface of the body of water and can be easily towed to the next location.

Summary of the invention

Therefore, it is a primary object of this invention to provide a new and improved shallow-water seismic prospecting cable. The object of this invention is obtained by the provision of a seismic cable attached at one end to a boat or barge and formed of an outer flexible inflatable tubular member of hollow construction. A plurality of seismometers is externally attached to the inflatable member. A vacuum tank and a pressure tank are located on the boat and selectively operable valve means is provided for connecting the flexible hollow tubular member to either tank. When the flexible tubular member is connected to the pressure tank, the tubular member is inflated and floats on the surface of the body of water; whereas, when the valve is operated to connect the hollow tubular member to the vacuum tank, the cable sinks to the bottom of the body of water so that the seismometers rest on the bottom.

The sinking of the cable is accomplished by virtue of deflation of the hollow tubular member. However, a radially rigid spiral metal tube is carried within the interior of the flexible tube and extends along the entire length thereof. This radially rigid tube has an outer diameter considerably less than the inner diameter of the flexible tube and prevents the flexible tube from becoming completely deflated at any point along its length. Consequently, the flexible tube cannot completely deflate at a point near or adjacent the boat while leaving an inflated trailing portion as would tend to occur if it were not for the presence of the radially rigid member.

A multi-wire cable is also located within the confines of the flexible tube but is located exteriorly of the radially rigid member. Each one of the seismometers is mounted externally of the cable along its length and is connected to the muti-wire conductor on the interior of the cable by flexible connection means. Longitudinal strength is imparted to the cable by a wire rope also extending along the length of the cable exteriorly of the radially rigid member but on the interior of the flexible tube. An air compressor is connected between the vacuum tank and the pressure tank on the boat so that the vacuum tank can be evacuated by the air compressor while the pressure tank is being pressurized. Therefore, a closed system is provided between the two tanks, the air compressor and the cable member per se. Consequently, chemicals can be employed in the system for completely removing water vapor from the system so as to greatly lower the possibility of electrical leakage from the various electrical conductors and other circuit elements.

*Description of the drawings*

FIGURE 1 is a perspective sectional view illustrating the preferred embodiment of the invention deployed from a boat or barge in shallow water;

FIGURE 2 is a bisecting sectional view of the cable portion of the preferred embodiment of the invention;

FIGURE 3 is a sectional view taken along lines 3—3 of FIGURE 2;

FIGURE 4 is a sectional view taken along lines 4—4 of FIGURE 2 and illustrating the cable in an inflated condition;

FIGURE 5 is a sectional view identical with FIGURE 4 but illustrating the parts in a deflated condition; and FIGURE 6 is a schematic view of the pressure regulating means of the preferred embodiment of this invention.

*Description of the preferred embodiment*

The preferred embodiment of this invention comprises a seismic cable system adapted for use in the shallow water of bays, lakes or any other water bodies and includes a cable member generally designated 20 and having a first end connected to a cable reel 21 on a boat or barge 22 as shown in FIGURE 1. Cable 20 is movable between a floating position illustrated by solid lines in FIGURE 1 and a submerged position illustrated in dashed lines wherein the cable lies along the bottom of the body of water. When the cable is in its floating position, it is easily moved by towing from one location to another. On the other hand, when the cable is resting on the bottom, it is in position for accurately recording shock waves during geophysical testing.

An elongated flexible enclosing tube member 26 forms the exterior of cable 20 and is formed of an inner ply 28 and an outer ply 30 as shown in FIGURES 2 and 4. The inner ply 28 is formed of flexible rubber or the like and provides the major portion of the strength of the flexible tube whereas the outer ply is formed of neoprene impregnated artificial fiber and provides an ear-resistant outer covering to resist cutting by submerged articles such as rocks, coral or any other sharp objects. Moreover, the outer ply 30 also provides strength to resist ballooning of the inner ply in case abnormal high pressures should occur within the cable.

As was noted previously, the forward end of cable member 20 is mounted in a winch reel 21 on the boat so that the interior of tube 26 is communicating through a line 34 to a selectively operable valve 36. The other, or trailing end, of tube 26 is closed in any conventional manner. Valve 36 is provided with a first line 38 extending to and communicating with a vacuum tank 40 and is also provided with a second line 42 extending to and communicating with a pressure tank 44. An air compressor 46 is connected between tanks 40 and 44 respectively by lines 48 and 50 each of which includes a check valve as illustrated in FIGURE 6. Consequently, operation of compressor 46 serves to evacuate the interior of vacuum tank 40 while pressurizing the interior of tank 44, and the check valves maintain this relationship when the compressor ceases operation. It will be seen from inspection of FIGURE 6 that valve 36 can be operated to connect the interior of cable member 20 with either the vacuum tank 40 or the pressurized tank 44. Furthermore, valve 36 can be positioned so that the interior of the elongated flexible tube is not connected to either of the tanks 40 or 44 and will consequently remain in a static condition.

Operation of valve 36 to connect the interior of flexible tube 26 in communication with the pressurized tank 44 will serve to inflate the elongated flexible tube 26 to the condition shown in FIGURE 4 so that the tube will be buoyant and float on the surface of the water. Alternatively, operation of valve 36 to provide communication with the vacuum tank 40 and the interior of tube 26 will serve to deflate the tube to the FIGURE 5 condition so that the tube assembly will sink to the bottom of the body of water in which such is deployed.

Turning now to FIGURE 2, it will be seen that two different sections of flexible tube 26 are adjoined by a metal junction member sealingly received on the interior of the facing ends of the respective tube sections. By adding or subtracting the number of tube sections, the length of the cable member 20 can be varied in accordance with the needs of the particular explorations to be performed.

A flexible fluid-tight connecting means 54 extends outwardly from metal junction member 52 to provide retention of a conventional exterior seismometer 56 to tube 26 etc. The interior end of flexible connecting member 54 is located within the confines of the elongated flexible tube 26 and a pair or more of wires 58 extending through flexible connecting member 54 is connected to a multi-wire cable 60 which extends along the length of cable member 20 on the interior of the elongated flexible tube 26. Multi-wire cable 60 is connected to a recording system (not shown) on the boat or barge 22 to record the output of each of the seismometers. Any number of seismometers can be employed in accordance with the nature of the particular exploration being performed.

A radially-rigid spirally wound non-collapsible metal tube member 64 extends along the length of the interior of the elongated flexible tube 26 to prevent complete collapsing of the tube when the valve 36 is operated to connect the forward end of tube 26 in communication with vacuum tank 40. Otherwise, such an operation of valve 36 could cause the forward end of the tube to collapse while the trailing end of the tube spaced farther from the boat would remain inflated. However, the presence of the radially rigid tubular member 64 prevents a complete collapsing of the elongated flexible tube 26 while enabling substantial deflation of its entire length.

Strength to resist longitudinal stresses applied to the cable member is provided by an interior wire rope member 66 extending along the length of cable 20. While wire rope 66 performs no active function other than that of providing the strength necessary for deployment of the cable and for resisting the natural forces of tide and current etc. and for towing, its weight aids in providing a rapid sinking of the cable when deflated.

The cable is initially deployed from the boat 22 in an inflated or floating condition as illustrated in FIGURES 1 and 4 and is deployed in general vertical alignment with the final alignment desired for the sounding when the cable is submerged. Therefore, when the desired deployment and orientation is obtained, valve 36 is operated to evacuate the interior of elongated flexible tube 26 so that such assumes the position illustrated in FIGURE 5. Consequently, the entire cable member 20 rapidly sinks to the bottom of the body of water and remains in this position during the remainder of the particular operation. Since seismometers 56 have a negative buoyancy, they unfailingly rest upon the bottom of the body of water. When the particular sounding operation has been completed, the entire cable is quickly refloated by operation of valve 36 to supply pressurized air to the interior of the elongated flexible tube 26 to cause the cable to float.

It should be understood that only a preferred embodiment of the invention has been illustrated herein and that many obvious modifications and variations will become apparent to those skilled in the art and that this invention should be interpreted and limited solely by the appended claims.

What is claimed is:

1. A shallow-water seismic cable system for use in stationary locations and having the capability of rapid vertical movement between a bottom resting position on the bottom of the body of water in which the cable is being employed and a surface floating position on the surface of said body of water, said cable system including an elongated flexible enclosing tube having one end of its interior selectively connectable to pressure regulating means capable of either raising or lowering the pressure in said tube to cause said tube to expand or contract to consequently float or sink, a hollow radially rigid tubular member within said tube for preventing said tube from contracting inwardly beyond the radius of said rigid tubular member when the pressure in said flexible enclosing tube is reduced and a plurality of seismometers attached externally of said flexible tube by flexible connecting means.

2. The invention recited in claim 1 additionally including a multi-conductor electrical cable supported on the interior of said flexible tube and being connected to each of said seismometers by said flexible connecting means.

3. The invention of claim 2 wherein said multi-conductor electrical cable is located exteriorly of said radially rigid tubular member.

4. The invention of claim 3 wherein said seismic cable system also includes a wire rope stress member on the interior of said flexible tube for absorbing longitudinal stresses applied to said cable.

5. The invention of claim 1 wherein said pressure regulating means comprises a vacuum tank, a pressure tank and selectively operable valve means for connecting said one end of said flexible tube to either of said tanks.

6. The invention of claim 5, additionally including a multi-conductor electrical cable supported on the interior of said flexible tube and being connected to each of said seismometers by said flexible connecting means.

7. The invention of claim 6 wherein said multi-conductor electrical cable is located exteriorly of said radially rigid tubular member.

8. The invention of claim 7 wherein said seismic cable system also includes a wire rope stress member on the interior of said flexible tube for absorbing longitudinal stresses applied to said cable.

9. The invention of claim 5 additionally including compressor means for pumping air from said vacuum tank into said pressure tank with said tanks, compressor, flexible tube and valve means forming a closed system.

10. The invention of claim 9 additionally including a multi-conductor electrical cable supported on the interior of said flexible tube exteriorly of said radially rigid tubular member and being connected to each of said seismometers by said flexible connecting means.

References Cited

UNITED STATES PATENTS 2,423,591 7/1947 Flude.
3,332,058 7/1967 Loper et al.

RODNEY D. BENNETT, JR., *Primary Examiner.*

D. C. KAUFMAN, *Assistant Examiner.*